United States Patent [19]
Hanson

[11] Patent Number: 5,636,014
[45] Date of Patent: Jun. 3, 1997

[54] METHOD AND APPARATUS FOR DETERMINING THE RATE OF ANGULAR ROTATION OF A ROTATING OBJECT

[75] Inventor: Steen G. Hanson, Fakse, Denmark

[73] Assignee: Forskningscenter Risø, Denmark

[21] Appl. No.: 406,998

[22] PCT Filed: Sep. 30, 1993

[86] PCT No.: PCT/DK93/00315

§ 371 Date: Jun. 15, 1995

§ 102(e) Date: Jun. 15, 1995

[87] PCT Pub. No.: WO94/08244

PCT Pub. Date: Apr. 14, 1994

[30] Foreign Application Priority Data

Sep. 30, 1992 [DK] Denmark .................. 1206/92

[51] Int. Cl.[6] ........................................... G01P 3/36
[52] U.S. Cl. ................................. 356/28; 324/175
[58] Field of Search .............. 356/28, 28.5; 324/175

[56] References Cited

U.S. PATENT DOCUMENTS

| | | |
|---|---|---|
| 3,419,330 | 12/1968 | Schneider. |
| 3,804,518 | 4/1974 | Meyr ............................. 356/28 |
| 4,104,489 | 8/1978 | Satoh et al. ................. 179/100.3 |
| 4,525,068 | 6/1985 | Mannava et al. ............. 356/28.5 |
| 4,925,296 | 5/1990 | Reichmuth .................... 356/28 |
| 5,007,731 | 4/1991 | Bütefisch ..................... 356/28.5 |
| 5,011,278 | 4/1991 | Farrell ......................... 356/28 |
| 5,054,913 | 10/1991 | Ishikawa et al. ............. 356/28.5 |

OTHER PUBLICATIONS

Mazumder, App. Physics Letters, vol. 16, No. 11, p. 462, 1 Jun. 1970.

*Primary Examiner*—Stephen C. Buczinski

[57] ABSTRACT

A method and apparatus for determining the rate of angular rotation of a rotating object comprising directing a beam of substantially coherent electromagnetic radiation towards the rotating object (80); detecting speckles generated by electromagnetic radiation (60) scattered from the object; and determining the transit time of the detected speckles; wherein the field of electromagnetic radiation (60) scattered from the object is Fourier-transformed by an optical Fourier-transforming system (20); and subjective speckles (71) of the Fourier-transformed electromagnetic radiation (70) are detected in at least two detection regions (12, 13) positioned in a detector plan (9) substantially parallel with and located in or near the Fourier-plane (10) of the Fourier-transforming system (20).

23 Claims, 9 Drawing Sheets

METHOD AND APPARATUS FOR DETERMINING THE RATE OF ANGULAR ROTATION OF A ROTATING OBJECT

DESCRIPTION

1. BACKGROUND OF THE INVENTION

The invention relates to a method and apparatus for determining the rate of rotation of a rotating object comprising directing a parallel beam of electromagnetic radiation towards the rotating object, detecting speckles from the object surface, and determining the transit times of the detected speckles.

The Technical Field of the Invention

The method and apparatus according to the present invention is useful for determining the rate of angular rotation, particularly the instantaneous rate of angular rotation, of a wide number of rotating objects having surfaces with predominantly one major specularly reflective component, e.g. objects such as rotating shafts of machined metal surfaces optionally polished, non-polished, painted, or covered with reflecting tape.

In the context of the present invention, the expression "rate of angular rotation" is intended to designate the instantaneous rotational velocity $d\phi/dt$ measured as the time dt it takes a surface element to rotate a given angle $d\phi$. Further, the expression "speckle" is intended to designate a detected speckle pattern of granular bright and dark spots produced by constructive and destructive interference between scattered specular and non-specular reflections from coherently irradiated irregular surfaces; the expression "objective speckles" is intended to designate speckles formed directly within the solid angle of the detection means; and the expression "subjective speckles" is intended to designate speckles obtained by optically transforming objective speckles. Speckles move dynamically as the surface of a continuous rotating object rotates.

Prior Art Disclosures

(a) Techniques Based on Objective Speckles

For the purpose of studying the dynamics of speckles produced in the near and far diffraction fields of rotating objects various methods for the determination of radius of curvature, angle of rotation, and speckle correlation have been disclosed in the literature.

Takai et al., Appl. Phys., B26, 185–192, (1981) disclose a method of real time measurement of the radius of curvature of a rotating diffuse object based on the time correlation length of the speckle intensity fluctuation produced in the Fresnel (near) diffraction field.

J. C. Marron and K. S. Schroeder, Applied Optics, Vol. 27, No. 20, 4279–4287, (1988) disclose a method of measuring correlations of dynamic speckles from rough rotating objects in which the speckle pattern, being translated perpendicularly to the object's axis of rotation, decorrelates depending on the amount of object rotation, locations of the source and observation planes, and the shape of the object.

Hayashi and Kitagawa, Applied Optics, Vol. 22, 3520–3525, (1983) disclose a method for measuring the rotation angle of a cylinder, particularly a small rotation angle with high resolution based on the speckle displacement detection in the (near) diffraction field caused by the cylinder surface rotation. The light intensity distributions of speckles before and after the cylinder surface displacement are detected by a detector array, and displacement of the speckle pattern is measured by computing their cross-correlation function. The distance to the cylinder surface and the radius of the cylinder have to be known.

In the above-mentioned articles nothing is indicated or suggested about dynamic measurements of rate of rotation.

Erdmann and Gellert, J. Opt. Soc. Am., Vol. 66, No. 11, 1194–1204, (1976) disclose studies of the effect of rotation and shape of objects with rotational symmetry on the speckle field of laser light scattered by such objects. The space-time correlation functions of the optical field and the intensity are calculated for moving objective speckles in the far field zone of symmetrically curved rotating surface of Gaussian roughness. It is found that the correlation function of the intensity depends on the radius of the incident beam, the local surface velocity and the radii of curvature in the illuminated region. Particularly, the cross-correlation function of the output of the two detectors at two different positions in the speckle field of a rotating flat disk illuminated by a spherical incident wavefront is experimentally shown to be very sensitive to normal displacements of the surface. However, nothing is indicated or suggested about how to remedy this displacement sensitivity of the surface.

Tribillon and Garcia-Garcia, Opt. Commun. Vol. 20, 229–233, (1977) disclose a method of double exposure and Fourier analysis of image speckles for the determination of the curvature of diffuse objects.

(b) Techniques Based on Subjective Speckles

SE Patent Application No. 8402159 discloses an electrooptic measuring apparatus for the measuring of translation, position, twist, velocity, vibration, shape, and edges of a surface wherein an electro-optic modulator consists of a liquid crystal for the detection of changes in the speckle pattern from a specularly reflecting surface, and of one or two-dimensional optical correlation means for correlating a reference speckle pattern with an actual incident speckle pattern. The correlation is measured by the vectorial shift of an imposed reference pattern on the liquid crystal required for obtaining maximum transmission intensity through the modulator. Nothing is indicated or suggested about dynamic measurements of the rate of rotation of a rotating object, for which purpose such a speckle correlation method would have the disadvantage of a long assessment time of the degree of correlation.

The above-mentioned prior art techniques have a number of disadvantages. Either they are not capable of dynamic measurements of the rate of rotation of a rotating object at all, or they are sensitive to parameters of the object, such as surface curvature and shape;

reflecting means on the surface; and translational motion, as well as optical turbulence. Therefore, there is a need for a method and apparatus for the determination of the rate of angular rotation of a rotating object which does not have these disadvantages.

2. DISCLOSURE OF THE INVENTION

It is the object of the present invention to provide a method and an apparatus for determining the rate of angular rotation of a rotating object wherein the determined rate of angular rotation is independent on surface curvature, shape, translational motion of the rotating object, and independent on the wavelength of the electromagnetic radiation used.

Further, it is the object of the present invention to provide such a method and apparatus wherein higher harmonics of the rate of angular rotation of a rotating object can be determined.

It is another object of the present invention to provide a method and an apparatus for determining the rate of rotation of a rotating object wherein it is not required to apply reflecting means, e.g. polishing or retro-reflecting tape, onto the surface.

It is still another object of the present invention to provide a method and an apparatus for determining the rate of rotation of a rotating object wherein the determined rate of angular rotation is relatively insensitive to optical turbulence, and wherein it is not required to have a mechanical contact with the object.

These objects are fulfilled by providing a method of determining the rate of angular rotation of a rotating object comprising:

a) directing a beam of substantially coherent electromagnetic radiation towards the rotating object;

b) detecting speckles generated by electromagnetic radiation scattered from the object; and c) determining the transit time of the detected speckles; characterized in d) that the field of electromagnetic radiation scattered from the object is Fourier-transformed by an optical Fourier-transforming system; and e) that subjective speckles of the Fourier-transformed electromagnetic radiation are detected in at least two detection regions positioned in a detector plane substantially parallel with and located in or near the Fourier-plane of the Fourier-transforming system.

Inventive Effects and Preferred Embodiments

According to the invention, the Fourier-transformation of the field of electromagnetic radiation scattered from the object by an optical Fourier-transforming system transforms the spherically scattered electromagnetic radiation from the surface of the object into a planar electromagnetic radiation, whereby it is surprisingly obtained that the angular rotation of the objective speckles is transformed to a linear displacement of the subjective speckles; or equivalently, that the angle of direction of the objective speckles corresponds to a linear coordinate of the subjective speckles in the Fourier-plane, the coordinate being the distance from the subjective speckle in the Fourier-plane to the optical axis of the Fourier-transforming system intercepting the Fourier-plane;

that concentrically orientated surface elements of the object having different radii reflect an irradiating beam in the same angle;

that a displaced surface element which is displaced by a translational displacement of the center of the axis of rotation reflects the irradiating beam in the same angle as before the displacement; and that the angle of reflection is independent of the wavelength;

which ensures that the determination of the rate of angular rotation of a rotating object is independent of surface curvature, shape, and translational motion of the rotating object, and independent of the wavelength of the electromagnetic radiation used.

Further, according to the invention, the subjective speckles of the Fourier-transformed electromagnetic radiation are detected in at least two detection regions positioned in a detector plane being substantially parallel with and located in or near the Fourier-plane of the Fourier-transforming system, whereby it is further obtained that the transit time dt of the linearly moving subjective speckles detected in the detector plane can be determined over a predetermined distance between the detection regions, or equivalently over a predetermined angle $d\phi$; and that the instantaneous rotational velocity $d\phi/dt$ can be determined from said determined transit time dt and said predetermined angle $d\phi$; which ensures that the rate of angular rotation of the rotating object can be determined.

In a preferred embodiment, the detector plane is located in the Fourier-plane of the Fourier-transforming system; and the substantially coherent electromagnetic radiation is substantially parallel and directed towards the rotating object from a source outside the Fourier-transforming system, whereby it is obtained that the source of substantially coherent electromagnetic radiation can be placed outside the Fourier-transforming system. Further, by directing the parallel beam towards the rotating object outside the Fourier-transforming system, the irradiation and detection systems can be separated.

In another preferred embodiment, the substantially coherent electromagnetic radiation is directed towards the rotating object through the Fourier-transforming system from a point source positioned near or in the detector plane, whereby it is obtained that the detector plane can be positioned outside the Fourier-plane.

By a point source is meant a source of a divergent electromagnetic radiation such as an optical fiber end, a laser chip, or a focused laser beam having a wavefront curvature so that it propagates optical distances of equal length from the point source to each of the at least two detection regions. Especially, for a point source such as a focused laser beam, the beam characteristics may require that the laser beam is positioned outside the detector plane. However, the optimum position of the beam can easily be adjusted by a person skilled in the art.

In a preferred embodiment, the optical Fourier-transforming system has the one focal plane near the surface of the object, whereby it is further obtained that the Fourier-transforming system becomes less sensitive to second order effects of a curved surface of the object.

In a preferred embodiment the optical Fourier-transforming system further comprises a telescopic means for scaling the Fourier-plane, whereby it is obtained that the Fourier-plane can be positioned in a suitable detector plane for the provision of a compact Fourier-transforming system.

Particularly useful Fourier-transforming systems exhibit minimal aberration and provide unambiguous correspondence between the direction of the beam and the position of the subjective speckles in the Fourier-plane. Such systems comprise lenses or diffractive optical elements which are well-focusing on infinite distances, and which may be selected by the person skilled in the art, e.g. by using ray-tracing techniques.

In preferred embodiments, the optical Fourier-transforming system comprises a refractive lens, preferably a convex lens or a cylinder lens, or a diffractive optical element, preferably a diffractive zone plate or a holographic lens.

Transit times of detected speckles between the at least two regions of detection are determined by methods known in the art including cross-correlation of signals from two detectors and auto-correlation of signals from one detector having two-spaced apertures.

In a preferred embodiment, the subjective speckles in the at least two detection regions are detected by two detectors, and the transit time of the subjective speckles between the two detection regions are determined by tracking the time lag which provides maximum cross-correlation between detection signals of the two regions.

In another preferred embodiment, the subjective speckles in the at least two detection regions are detected by one detector having two apertures, and the transit time of the subjective speckles between the two detection regions is determined by tracking the time lag which provides maximum auto-correlation between detection signals of the two regions.

Subjective speckles can be detected by detectors known in the art including single semiconductor detectors or photo-multiplier tubes which can be positioned in said two detection regions.

In a preferred embodiment, the subjective speckles in the at least two detection regions are detected by one or more detectors remotely positioned and connected to said regions by optical waveguides.

Further, said objects of the present invention are fulfilled by providing an apparatus for determining the rate of angular rotation of a rotating object comprising:

a) a source of substantially coherent electromagnetic radiation;

b) detection means for detecting speckles generated by electromagnetic radiation scattered from the object; and c) electronic means for determining the transit time of the detected speckles;

characterized in, d) that it further comprises an optical Fourier-transforming system Fourier-transforming the field of electromagnetic radiation scattered from the object; and e) that the detection means are connected to two aperture means positioned in a detector plane substantially parallel with and located in or near the Fourier-plane of the Fourier-transforming system.

Preferred embodiments of the apparatus are defined in the claims.

According to the invention higher harmonics of the rate of angular rotation can be determined. Thus, by tracking the time lag with maximum cross-correlation or tracking the non-zero time lag with auto-correlation between two detector signals, it is obtained that the instantaneous time lag is inversely proportional to the instantaneous rate of rotation, whereby it is ensured that a large range of frequencies can be detected. The frequencies include mixed frequencies of constant rates of rotation superposed by ac components e.g. generated by periodic or random factors such as the shadow effect of the tower in the rotation of a three-bladed wind turbine motor. The maximum frequency of the harmonics that can be measured is determined by the speed of the tracker tracking the time lag and by the angular separation between the detection points.

Further, the invention has the advantages that the detected subjective speckles are generated by microscopic irregularities of the surface of the object, whereby it is ensured that non-polished machined surfaces can be applied directly, and that optical turbulence having an extent larger than the distance between the surface elements of the object generating the reflections to be detected as subjective speckles can be avoided or reduced.

Also, the invention has the advantage of being a non-contact period which is well-suited for e.g. rotating shafts of small diameters because the spot size of the irradiating coherent radiation can be kept very small.

Other objects and further scopes of the present invention will become apparent from the detailed description. It should be understood that the detailed description and specific examples are only illustrations of preferred embodiments of the invention, and that various changes and modifications are possible without deviation from the spirit and scope of the present invention as apparent to those skilled in the art.

3. BRIEF DESCRIPTION OF DRAWINGS

4. DETAILED DESCRIPTION AND PREFERRED EMBODIMENTS

Surface Irradiation and Reflections

Figure 1A:
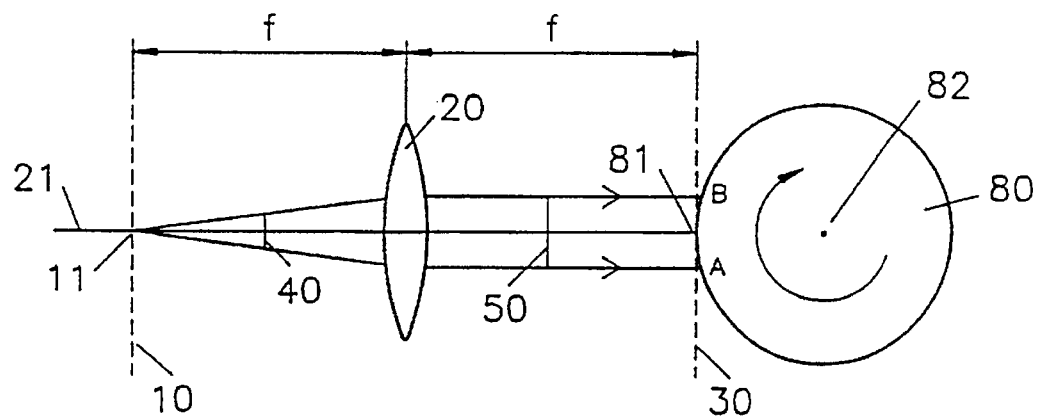
FIG. 1A shows a cross-sectional view of a preferred embodiment in which a collimated coherent light beam is directed towards a rotating cylinder within the aperture of a Fourier-transforming lens.

In FIG. 1A, which shows a cross-sectional sketch of a preferred embodiment, a spherical (or plane) wave 40 of coherent light diverges from a laser point source 11 positioned in the Fourier-plane 10 of a converging lens 20 having a focal length f. The spherical wave 40 is collimated to a plane wave 50 which propagates towards the surface 81 of a rotating cylinder 80. The cylinder rotates clockwise with an axis of rotation 82 perpendicularly to the optical axis 21. The surface 81 is positioned approximately in the Fourier-plane 30 of the converging lens 20.

Figure 1B:
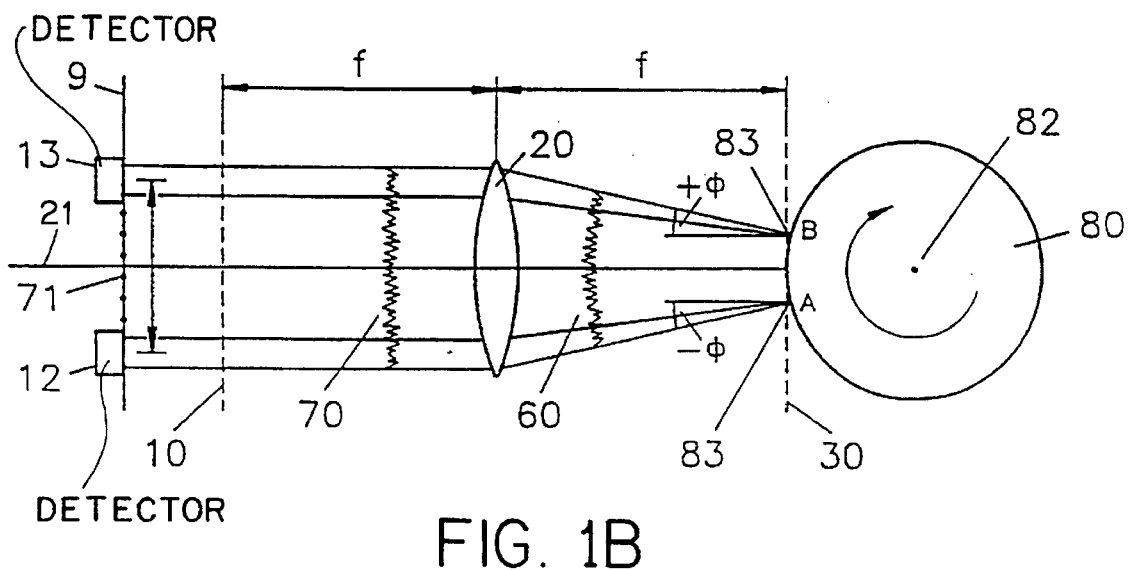
FIG. 1B shows a cross-sectional view of a preferred embodiment in which the reflected beam provides linearly moving speckles in a detector plane.

The plane wave 50 and the surface element 83 in position A (FIG. 1B) provide a spherically scattered reflection 60 with its normal in an angle $-\phi$ with respect to the normal of the planar wave 50. This occurs when the surface element is orientated in such way that the angle of incidence equals the angle of reflection. Following rotating the cylinder 80 an angle ø, the same surface element 83 which is now in position B in relation to the plane wave 50, provides a new reflection in an angle +ø. In total, a rotation of ø degrees of the cylinder provides a rotation of 2ø of the reflection. FIG. 1B further indicates the reflections falling within the solid angles of the detectors 12 and 13 positioned in the detector plane 9 outside the Fourier-plane 10. It should be noted that if the incoming light is a plane wave, the detectors 12 and 13 shall be positioned in the Fourier-plane 10.

The orientation of the surface element depends on the structure of the surface, e.g. at the µm level, and the radius of curvature of the cylinder, and it may differ from one surface element to another.

Generally, angles of reflections are determined by the spot size of the irradiating plane wave 50 on the surface 81 from A to B, the radius of curvature of the object 80, and the orientation of the individual surface elements 83 of the irradiated surface 81. It is preferred that reflections are chosen such that the angles of reflection ±ø are less than the ratio of the width of the spot of the irradiating plane wave 50 on the surface 81 and the radius of curvature of the cylinder 80 whereby it is obtained that other orientations of the individual surface elements may provide usable reflections within larger angles, particularly for small spot sizes and small mutual detector distances.

Figure 1C:
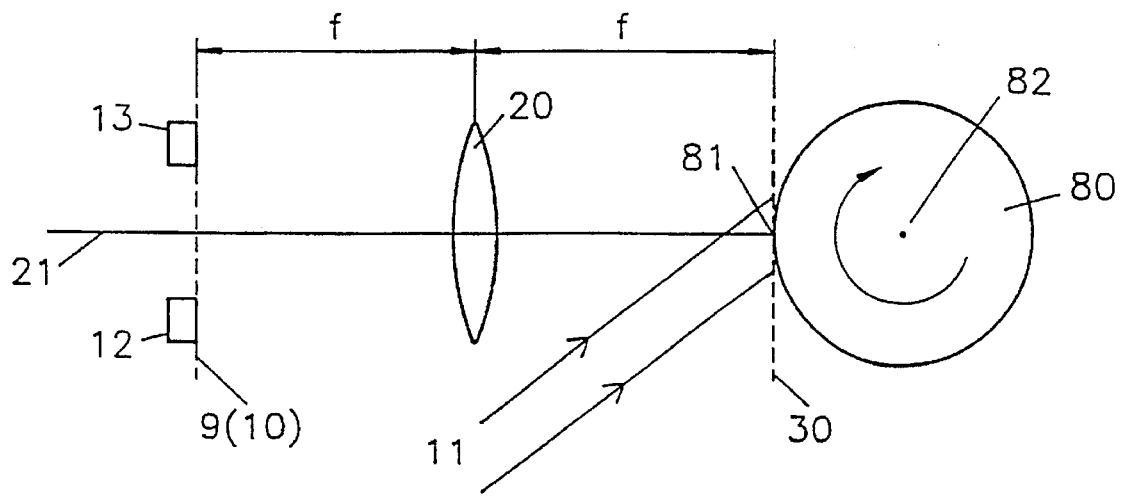
FIG. 1C shows an embodiment in which a substantially parallel coherent light beam is directed towards a rotating cylinder outside the Fourier-transforming lens.

In FIG. 1C, another embodiment is shown in which the cylinder surface 81 is irradiated by a coherent light source 11 providing a substantial parallel coherent light beam outside the lens 20.

Figure 1D:
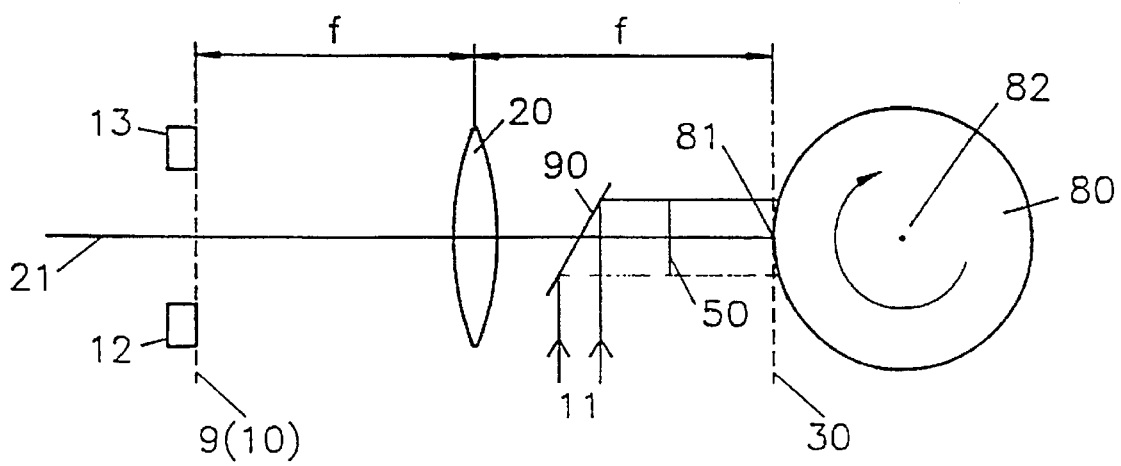
FIG. 1D shows another embodiment in which a semi-transparent mirror directs a substantially parallel coherent light beam towards a rotating cylinder outside the Fourier-transforming lens.

In FIG. 1D, another preferred embodiment is shown in which a semi-transparent mirror directs the substantially parallel coherent light beam from a coherent light source 11 towards the cylinder surface 81.

In the embodiments shown in FIGS. 1C and 1D, the detector plane 9 coincides with the Fourier-plane 10.

Subjective Speckles

In FIG. 1B showing a cross-sectional view of a preferred embodiment, the plane wave 50 is reflected and diverted from the rotating surface 81 producing a reflected complex wave pattern 60 composed of components providing speckles by constructive and destructive interference between scattered specular and non-specular reflections.

The reflected complex wave pattern 60 is Fourier-transformed to a complex transformed wave pattern 70 by the converging lens 20 producing subjective speckles 71 which move linearly in the detector plane 9 in the direction indicated by the arrow, i.e. in the direction corresponding to clockwise rotation of the cylinder 80, when the cylinder 80 is rotated.

Determination of the Rate of Rotation

Referring to FIG. 1B, subjective speckles 71 moving linearly and perpendicularly to the axis of rotation 82 by rotating the cylinder surface 81 are detected by a first detector 12 and a second detector 13. The first detector 12 has a solid angle Δø and is positioned in the detector plane 9 at an angular distance −ø to the optical axis 21. The second detector 13, preferably similar to detector 12, is positioned at an angle +ø, also in the detector plane 9.

Rotating the surface element 83 an angle ø, the subjective speckles are moved linearly over a distance in the detector plane corresponding to the angular distance 2ø.

The detector signals of the two detectors 12 and 13 are cross-correlated electronically by methods known in the art, and by tracking the time lag which provides maximum cross-correlation between the two detector signals, the transit time of subjective speckles is provided and converted to a measurement of the rate of rotation of the cylinder.

It is not necessary to apply two detectors. In another embodiment, one detector having two apertures is applied and the rate of rotation is determined from the autocorrelation of detector signals.

Subjective speckles can be detected by one or more detectors remotely positioned from the detector plane. In a preferred embodiment, two optical waveguides optical fibers transmit the subjective speckles to two detectors remote from the Fourier-transforming optical system.

Fourier-Transforming Optical Systems

The Fourier-transforming optical system is illustrated by a converging lens. However, other optical Fourier-transforming devices can be applied, e.g. refractive and diffractive optical elements, and active liquid crystals.

Fourier-transforming refractive optical elements are selected from refractive lenses. Convex lenses or cylinder lenses are preferred.

Fourier-transforming diffractive optical elements are selected from diffractive zone plates or holographic lenses, e.g. computer generated. Holographic lenses are preferred.

Figure 3:
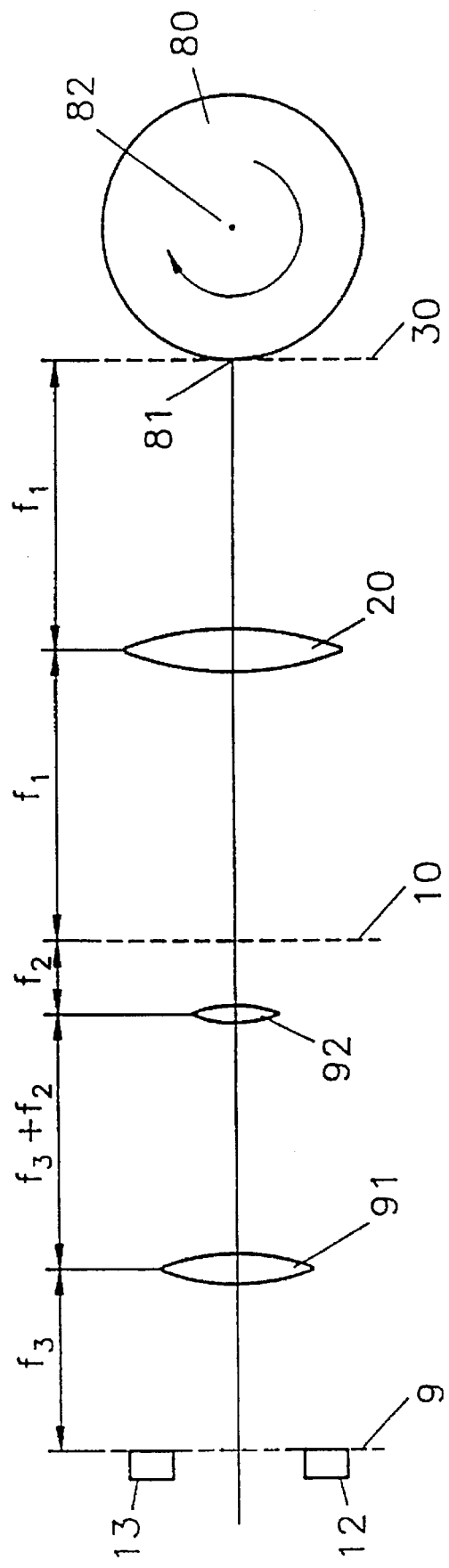
FIG. 3 shows an embodiment comprising a telescopic optical system.

The Fourier-transforming optical system may comprise telescopic means to magnify or reduce the Fourier-plane 10. In FIG. 3 a preferred embodiment is shown in which a telescopic set of lenses 92 and 91 depicts the Fourier-plane 10 to the detector plane 9 where the detectors 12 and 13 are positioned.

Configurations of Light Source and Detection Regions

Generally, the positions of the two detection regions in the detector plane can be any symmetrical or asymmetrical position in relation to the intercept of the optical axis 21 (or the axis of rotation 82), although symmetrical configurations are preferred.

Figure 2A:
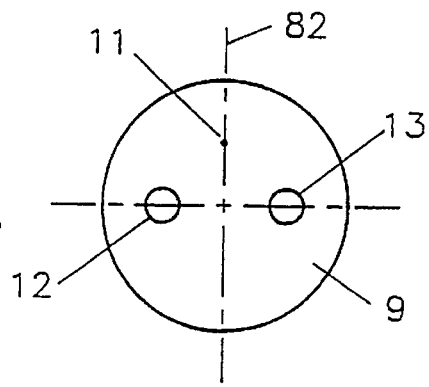
FIG. 2A–2D show embodiments in which the detectors are positioned in different positions in relation to a coherent light source in the detector plane.
Figure 2B:
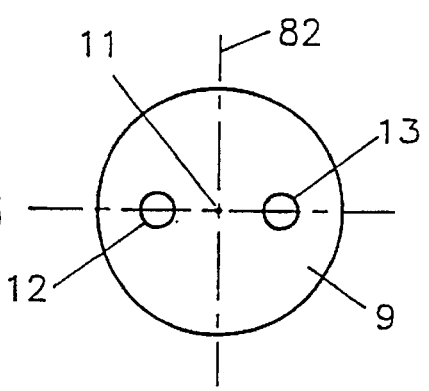
Figure 2C:
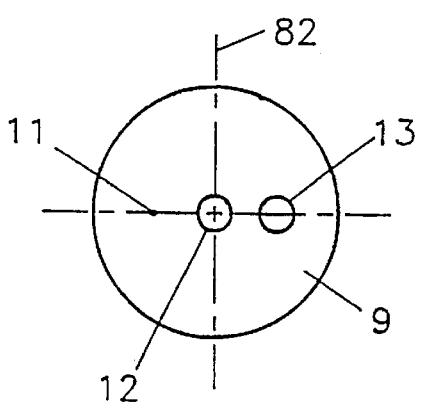
Figure 2D:
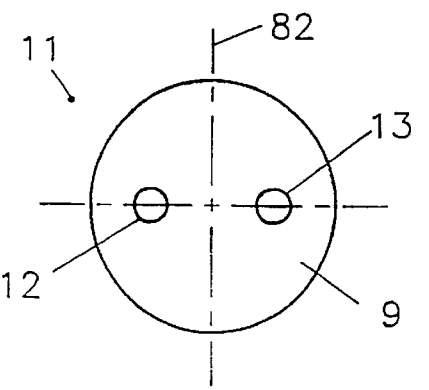

In FIGS. 2A, 2B, 2C, and 2D specific positions of the first 12 and second 13 detector and the coherent light source 11 are shown in the detector plane 9 in relation to the axis of rotation 82. Thus, the coherent light source 11 can be placed anywhere in the aperture of the lens 20, and even outside the lens 20 as shown in FIG. 1C, 1D, and 2D. In this configuration, the coherent light source can be a laser diode in a collimator pen, e.g. a Philips CQL 71A.

Figure 4:
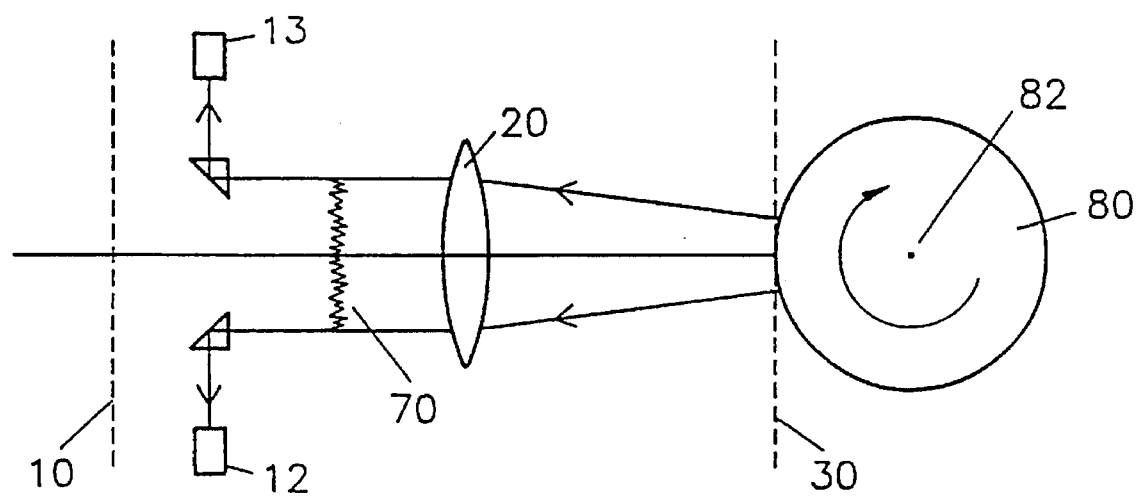
FIG. 4 shows an embodiment comprising reflected subjective speckles.

FIG. 4 shows another preferred embodiment where the distance to the rotating object is fixed. The complex transformed wave pattern 70 is splitted into two waves by beam splitting means, e.g. two prisms, and then detected by the detectors 12 and 13.

Detector Apertures

Figure 5A:
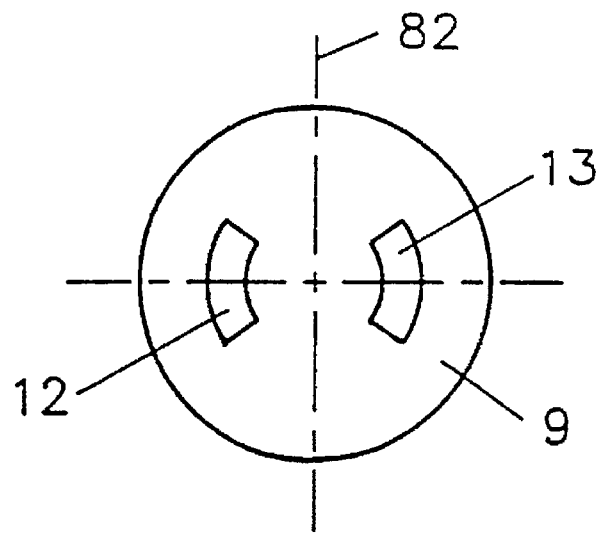
FIG. 5A–5B show preferred embodiments of detector apertures.

In FIG. 5A a preferred embodiment is shown in which the apertures of the detectors 12 and 13 are shaped to compensate for the effect of a small change in the orientation of the axis of rotation 82.

In the preferred embodiment shown in FIG. 1B, the component of the rotation rate along the line connecting the detectors 12 and 13, e.g. perpendicularly to the optical axis 21, is measured, whereas in the embodiment of FIG. 5A an approximately numerical value of the rotation is measured.

Figure 5B:
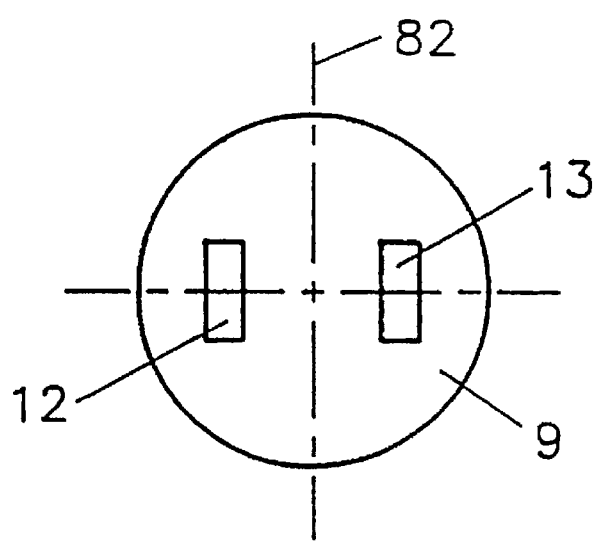

In FIG. 5B, another preferred embodiment is shown in which the apertures of the detectors 12 and 13 are rectangular in shape in order to allow an increased intensity of subjective speckles to the detectors, and a decreased sensitivity to variations in the axis of rotation 82.

Cross-Correlation of Detector Signals

Electronical tracking of the time lag providing maximum cross-correlation between the two detector signals can be performed by various methods known in the art.

Figure 6:
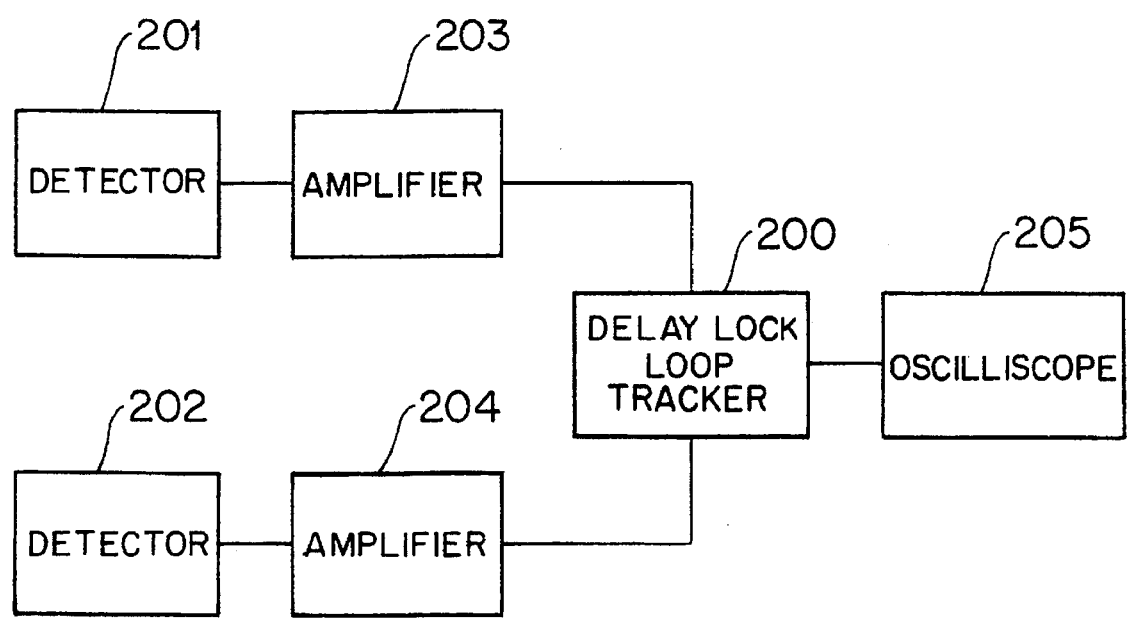
FIG. 6 shows a diagram of an experimental electronic setup.

In FIG. 6, a diagram of a preferred embodiment based on electronical tracking is shown. A "Delay Lock Loop" tracker 200 (Risø P 835A) of the type disclosed by L. Lading, "Processing of Laser Anemometry Signals", Proceedings of the Dynamic Flow Conference 1978, p. 801–823, which is incorporated by reference, receives filtered and amplified signals via filter amplifiers 203,204 from two detectors 201,202, and a signal locked to the maximum of the cross-correlation function representing the time difference between the two received detector signals is fed to an oscilloscope 205, LeCroy 9400.

Object Surfaces

Generally, subjective speckles arise when specularly reflected light, i.e. reflections from a surface having irregularities smaller than the wavelength of the incident radiation, interferes with light scattered from macrostructures in the surface, i.e. light scattered from irregularities larger than the wavelength of the incident radiation, and which reflections are Fourier-transformed into a speckle pattern in the Fourier-plane.

According to the invention surfaces having a major proportion of specularly reflected light can be applied.

Coherent Light

Subjective speckles may be generated by both coherent electromagnetic radiation or incoherent electromagnetic radiation having an induced spatial coherence.

The wavelength can be any wavelength suitable of generating speckles from the surface in question. Particularly preferred are wavelengths ranging from 0.4 µm to 1.6 µm.

5. EXAMPLES

Example 1

An apparatus according to the one shown in FIG. 1A and FIG. 4 with electronic correlation means according to the one shown in FIG. 6 was implemented.

Figure 7:
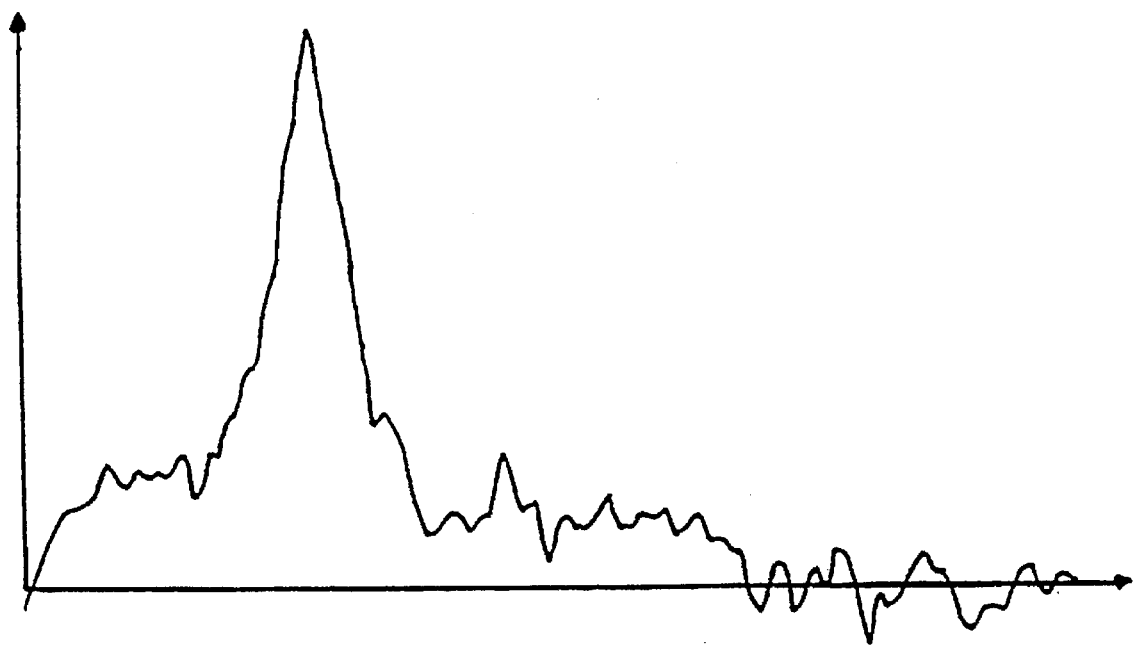
FIG. 7 shows typical cross correlation measurements versus time lag obtained by using the configurations of FIG. 1A and FIG. 4 together with the electronic set-up shown in FIG. 6.

For a shaft of 6 mm rotating at a rate of 6.3 Hz, a typical cross-correlation curve versus delay time is shown in FIG. 7.

Figure 8A:
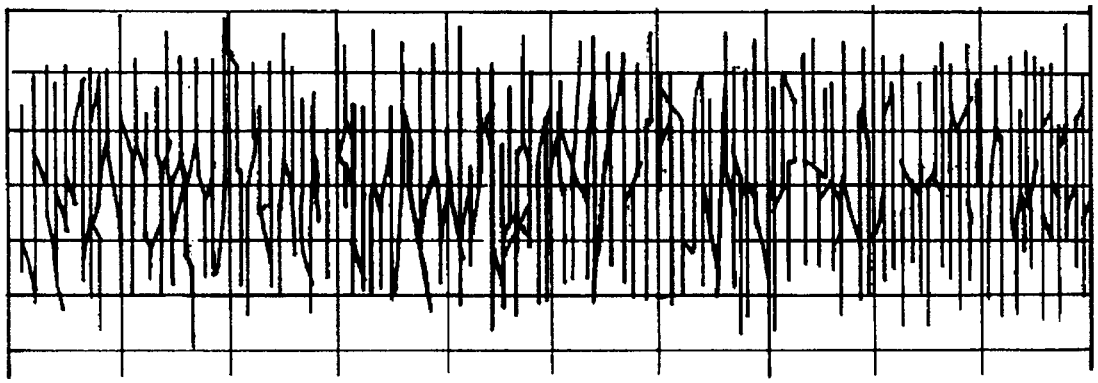
FIG. 8 shows typical results obtained.
Figure 8B:
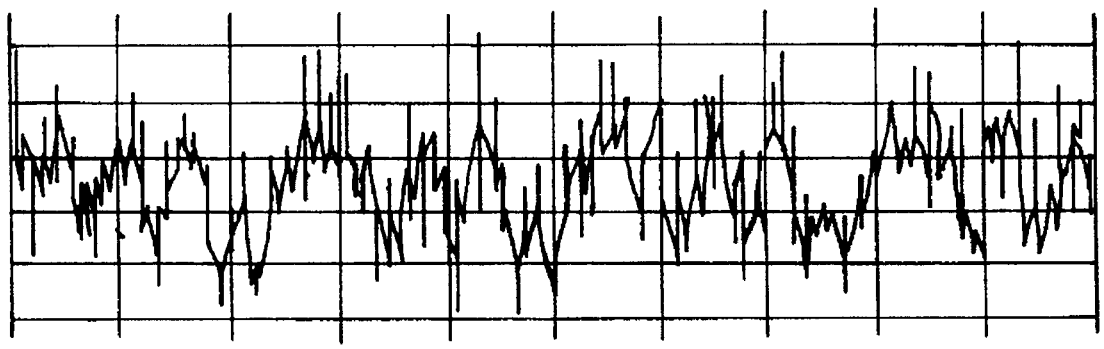
Figure 8C:
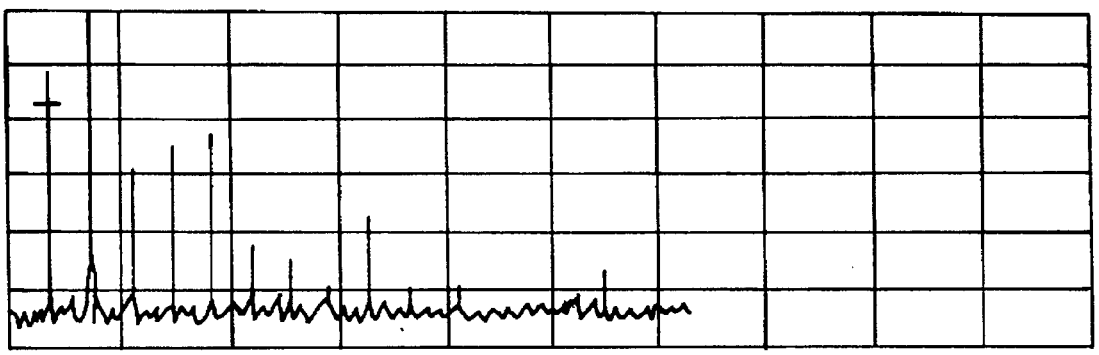

For the same shaft rotating at a rate of 7.2 Hz, transit times are shown in FIG. 8. The upper curve (a) shows the analog VCO output of the Delay Lock Loop with a time base of 0.5 seconds per division as abscissa and a sensitivity of 100 mV per division as ordinate having fluctuations in the rate of rotation with a rms-value of about 100 mV. The curve (b) in the middle shows a 10 times expansion with a time base of 50 milliseconds per division, i.e. to one full rotation of the shaft of 139 milliseconds corresponds about 2.5 divisions, and the lower curve (c) shows the fast Fourier transform of the analog output (1250 points) showing the first harmonic of the rate of rotation of 7.2 Hz (indicated with a cross) and its higher harmonics.

I claim:

1. A method of determining the rate of angular rotation of a rotating object comprising:

a) directing a beam of substantially coherent electromagnetic radiation towards the rotating object;

b) Fourier transforming the field of electromagnetic radiation scattered from the object by an optical Fourier-transforming system; and c) detecting subjective speckles of the Fourier-transformed electromagnetic radiation in at least two detection regions positioned in a detector plane substantially parallel with and located in or near the Fourier-plane of the Fourier-transforming system; and d) determining the transit time of the detected speckles as a function of the rate of angular rotation.

2. A method according to claim 1, wherein the detector plane is located in the Fourier-plane of the Fourier-transforming system; and the substantially coherent electromagnetic radiation is substantially parallel and directed towards the rotating object from a source outside of the Fourier-transforming system.

3. A method according to claim 1, wherein the substantially coherent electromagnetic radiation is directed towards the rotating object through the Fourier-transforming system from a point source positioned near or in the detector plane.

4. A method according to claim 1, wherein the optical Fourier-transforming system has one focal plane near the surface of the object.

5. A method according to claim 1, wherein the optical Fourier-transforming system further comprises a telescopic means for scaling the Fourier-plane.

6. A method according to claim 1, wherein the optical Fourier-transforming system comprises a refractive lens, preferably a convex lens or a cylinder lens.

7. A method according to claim 1, wherein the Fourier-transforming system comprises a diffractive optical element.

8. The method of claim 7, wherein the diffractive optical element is a diffractive zone plate.

9. The method of claim 7, wherein the diffractive optical element is a holographic lens.

10. A method according to claim 1, wherein the subjective speckles in the at least two detection regions are detected by two detectors; and that the transit times of the subjective speckles between the two detection regions (12,13) are determined by tracking the time lag which provides maximum cross-correlation between detection signals of the two regions.

11. A method according to claim 1, wherein the subjective speckles in the at least two detection regions are detected by one detector having two apertures; and that the transit times of the subjective speckles between the two detection regions are determined by tracking the non-zero time lag which provides maximum auto-correlation between detection signals of the two regions.

12. A method according to claim 1, wherein the subjective speckles in the at least two detection regions (12,13) are detected by one or more detectors remotely positioned and connected to said regions by optical waveguides.

13. An apparatus for determining the rate of angular rotation of a rotating object comprising:

a) a source of substantially coherent electromagnetic radiation for irradiating the object;

b) an optical Fourier-transforming system Fourier-transforming the field of electromagnetic radiation scattered from the object;

c) detection means for detecting subjective speckles of the Fourier-transformed electromagnetic radiation, said detection means connected to two aperture means positioned in a detector plane substantially parallel with and located in or near the Fourier-plane of the Fourier-transforming system; and d) electronic means for determining the transit time of the detected subjective speckles as a function of the rate of angular rotation.

14. An apparatus according to claim 13, wherein the detector plane is located in the Fourier-plane of the Fourier-transforming system; and the substantially coherent electromagnetic radiation is substantially parallel and directed towards the rotating object from the source outside of the Fourier-transforming system (20).

15. An apparatus according to claim 13, wherein the source of the substantially coherent electromagnetic radiation is a point source positioned near or in the detector plane, and the substantially coherent electromagnetic radiation is directed towards the rotating object through the Fourier-transforming system from the point source.

16. An apparatus according to claim 13, wherein the optical Fourier-transforming system further comprises a telescopic means for scaling the Fourier-plane.

17. An apparatus according to claim 13, wherein the optical Fourier-transforming system comprises a refractive lens.

18. The apparatus of claim 17, wherein the refractive lens is a convex lens.

19. The apparatus of claim 17, wherein the refractive lens is a cylinder lens.

20. An apparatus according to claim 13, wherein the detection means consists of two detectors, and that the electronic means for determining the transit times of the detected speckles consists of a tracker tracking the time lag providing the maximum cross-correlation between detection signals of the two detectors.

21. An apparatus according to claim 13, wherein the detection means consists of one detector having two apertures, and that the electronic means for determining the transit times of the detected speckles comprises a tracker tracking the non-zero time lag providing a maximum auto-correlation between detection signals of the two apertures.

22. An apparatus according to claim 13, wherein the detection means comprises optical waveguides.

23. The apparatus of claim 22, wherein the optical waveguides are optical fiber waveguides.

* * * * *